United States Patent
Badger, II et al.

(10) Patent No.: US 12,233,735 B2
(45) Date of Patent: Feb. 25, 2025

(54) CUSTOMIZABLE ELECTRIC VEHICLE SUPPLY EQUIPMENT SYSTEMS

(71) Applicant: FORD GLOBAL TECHNOLOGIES, LLC, Dearborn, MI (US)

(72) Inventors: Charles Everett Badger, II, Westland, MI (US); Toussaint Carpenter, Westland, MI (US); Ryan O'Gorman, Beverly Hills, MI (US); Dominic Gelfuso, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 696 days.

(21) Appl. No.: 17/501,461

(22) Filed: Oct. 14, 2021

(65) Prior Publication Data

US 2023/0123176 A1   Apr. 20, 2023

(51) Int. Cl.
| | |
|---|---|
| *B60L 53/62* | (2019.01) |
| *B60L 53/18* | (2019.01) |
| *B60L 53/66* | (2019.01) |
| *B60L 58/12* | (2019.01) |
| *H02J 7/00* | (2006.01) |

(52) U.S. Cl.
CPC .............. *B60L 53/62* (2019.02); *B60L 53/18* (2019.02); *B60L 53/66* (2019.02); *B60L 58/12* (2019.02); *H02J 7/0042* (2013.01); *H02J 7/0048* (2020.01)

(58) Field of Classification Search
CPC .......... B60L 53/62; B60L 53/66; B60L 53/18; B60L 58/12; H02J 7/0048; H02J 7/0042
USPC ......................................................... 320/109
See application file for complete search history.

(56) References Cited

U.S. PATENT DOCUMENTS

| | | | |
|---|---|---|---|
| 9,840,156 B2 | 12/2017 | DeBoer, III | |
| 2011/0175569 A1* | 7/2011 | Austin | B60L 53/63 320/109 |
| 2012/0242466 A1* | 9/2012 | Stillfried | B60L 58/12 340/425.5 |
| 2019/0217714 A1* | 7/2019 | Turek | B60L 3/0038 |
| 2020/0274380 A1* | 8/2020 | Moubedi | H02J 7/007184 |
| 2021/0396367 A1* | 12/2021 | Guedez | F21S 9/02 |

FOREIGN PATENT DOCUMENTS

| | | |
|---|---|---|
| CN | 205724984 U | 11/2016 |
| DE | 102014010414 A1 | 1/2016 |
| GB | 2550480 B | 6/2018 |
| JP | 2008252986 * | 10/2008 |
| JP | 4864791 B2 | 2/2012 |

OTHER PUBLICATIONS

Machine Translation of JP2008252986, 18 pages (Year: 2008).*

* cited by examiner

*Primary Examiner* — Nathaniel R Pelton
(74) *Attorney, Agent, or Firm* — David B. Kelley; Carlson, Gaskey & Olds, P.C.

(57) ABSTRACT

Customizable electric vehicle supply equipment (EVSE) systems may be utilized for charging electrified vehicles. Exemplary EVSE systems may include a charging cord assembly having a cable that includes an outer sheath and a lighting module housed within the outer sheath. The lighting module may be controlled to emit lighting effects for providing visual indications of various electrified vehicle charging statuses. Settings associated with the lighting effects may be customized within a human machine interface (HMI) of the EVSE system.

19 Claims, 7 Drawing Sheets

CUSTOMIZABLE ELECTRIC VEHICLE SUPPLY EQUIPMENT SYSTEMS

TECHNICAL FIELD

This disclosure relates generally to electrified vehicles, and more particularly to customizable electric vehicle supply equipment systems.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charge port that is connectable to electric vehicle supply equipment (EVSE) for charging the traction battery pack.

SUMMARY

An electric vehicle supply equipment (EVSE) system according to an exemplary aspect of the present disclosure includes, among other things, an electric vehicle supply equipment (EVSE) housing, a charging cord assembly connected to the EVSE housing and including a cable that includes an outer sheath and a lighting module housed within the outer sheath. A controller is programmed to command the lighting module to emit a lighting effect that provides a visual indication of an electrified vehicle charging status.

In a further non-limiting embodiment of the foregoing EVSE system, the lighting module includes one or more light sources and a printed circuit board (PCB).

In a further non-limiting embodiment of either of the foregoing EVSE systems, the one or more light sources is a multi-colored light emitting diode (LED).

In a further non-limiting embodiment of any of the foregoing EVSE systems, the lighting module is configured in the form of a lighting ring that is circumscribed by the outer sheath.

In a further non-limiting embodiment of any of the foregoing EVSE systems, the outer sheath comprises a light permeable material.

In a further non-limiting embodiment of any of the foregoing EVSE systems, the lighting effect includes a visual indication of a state of charge (SOC) of a traction battery pack of the electrified vehicle.

In a further non-limiting embodiment of any of the foregoing EVSE systems, the lighting effect includes a visual indication of a direction of energy transfer associated with an energy transfer event.

In a further non-limiting embodiment of any of the foregoing EVSE systems, the lighting effect includes a pulsing pattern that indicates the direction of the energy transfer.

In a further non-limiting embodiment of any of the foregoing EVSE systems, the lighting effect includes a visual indication of a charging fault condition.

In a further non-limiting embodiment of any of the foregoing EVSE systems, the lighting effect includes a visual indication of a pre-conditioning event associated with a passenger cabin or a traction battery pack of the electrified vehicle.

In a further non-limiting embodiment of any of the foregoing EVSE systems, a human machine interface (HMI) is configured to allow a user to modify a setting associated with the lighting effect.

In a further non-limiting embodiment of any of the foregoing EVSE systems, the setting includes a color, a brightness, a pattern, or any combinations thereof.

A method according to another exemplary aspect of the present disclosure includes, among other things, receiving, at a controller of an electric vehicle supply equipment (EVSE) system, a vehicle data signal from an electrified vehicle that is operably coupled to the EVSE system. The vehicle data signal includes charging status information concerning the electrified vehicle. The method further includes commanding a lighting module of a cable of a charging cord assembly of the EVSE system to emit a lighting effect that is based on the charging status information.

In a further non-limiting embodiment of the foregoing method, the lighting effect includes a visual indication of a state of charge (SOC) of a traction battery pack of the electrified vehicle.

In a further non-limiting embodiment of either of the foregoing methods, the lighting effect includes a visual indication of an amount of time remaining for transferring energy between a grid power source and the electrified vehicle.

In a further non-limiting embodiment of any of the foregoing methods, the lighting effect includes a visual indication of a direction of energy transfer between a grid power source and the electrified vehicle.

In a further non-limiting embodiment of any of the foregoing methods, the lighting effect includes a pulsing pattern that indicates the direction of the energy transfer.

In a further non-limiting embodiment of any of the foregoing methods, the lighting effect includes a visual indication of a charging fault condition associated with the electrified vehicle.

In a further non-limiting embodiment of any of the foregoing methods, the lighting effect includes a visual indication of a pre-conditioning event associated with a passenger cabin or a traction battery pack of the electrified vehicle.

In a further non-limiting embodiment of any of the foregoing methods, the method includes receiving an input signal indicative of a modification to a setting associated with the lighting effect from a human machine interface (HMI).

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes customizable electric vehicle supply equipment (EVSE) systems for charging electrified vehicles. Exemplary EVSE systems may include a charging cord assembly having a cable that includes an outer sheath and a lighting module housed within the outer sheath. The lighting module may be controlled to emit lighting effects for providing visual indications of various electrified vehicle charging statuses. Settings associated with the lighting effects may be customized within a human machine interface (HMI) of the EVSE system. These and other features of this disclosure are discussed in greater detail in the following paragraphs of this detailed description.

Figure 1:
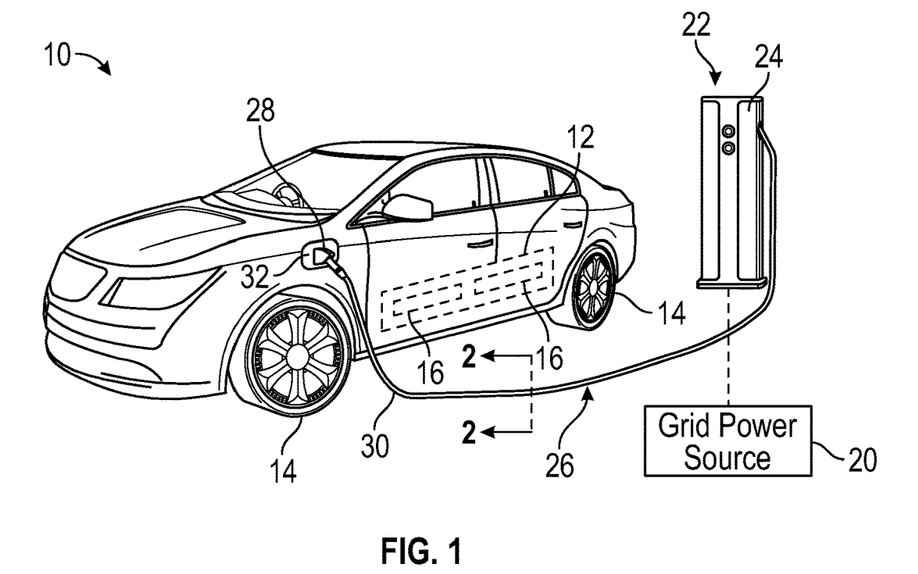
FIG. 1 illustrates an electrified vehicle operably connected to an electric vehicle supply equipment (EVSE) system.

FIG. 1 illustrates an exemplary electrified vehicle 10 that includes a traction battery pack 12. The electrified vehicle 10 may include any electrified powertrain capable of applying a torque from an electric machine for driving drive wheels 14 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain of the electrified vehicle 10 may electrically propel the drive wheels 14 either with or without the assistance of an internal combustion engine.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (e.g., battery assemblies or groupings of battery cells) capable of outputting electrical power to one or more electric machines (e.g., electric motors) of the electrified vehicle 10. Other types of energy storage devices and/or output devices can also be used to electrically power the electrified vehicle 10.

The traction battery pack 12 may periodically require charging for replenishing its energy levels. The electrified vehicle 10 may therefore interface with a grid power source 20 (e.g., AC power, solar power, wind power, or combinations thereof) through an electric vehicle supply equipment (EVSE) system 22 in order to transfer energy from the grid power source 20 to the electrified vehicle 10 for charging the traction battery pack 12. In some implementations, the EVSE system 22 may be configured to provide bidirectional functionality for either transferring energy from the grid power source 20 to the electrified vehicle 10 or from the electrified vehicle 10 to the grid power source 20. In such an implementation, the EVSE system 22 may include various equipment, including but not limited to an AC/DC converter, a common HVDC bus, an isolation transformer, a DC/DC converter, etc. for configuring the EVSE system 22 to either send energy to the electrified vehicle 10 or receive energy from the electrified vehicle 10.

The EVSE system 22 may include an EVSE housing 24 and a charging cord assembly 26. The EVSE housing 24 may be configured as a wall box, a charging station stanchion, etc. The specific configuration of the EVSE housing 24 is not intended to limit this disclosure. The EVSE housing 24 may include the necessary equipment (e.g., relays, human machine interfaces, etc.) for coordinating the transfer of energy between the electrified vehicle 10 and the grid power source 20.

The charging cord assembly 26 may include a charge coupler 28 and a cable 30. The cable 30 may be connected at one end to the charge coupler 28 and at an opposite end to the EVSE housing 24. The charge coupler 28 may be coupled (e.g., plugged-in) to a charge port assembly 32 (sometimes referred to as a vehicle inlet assembly) of the electrified vehicle 10 in order to transfer energy between the electrified vehicle 10 and the grid power source 20. In some embodiments, the charging cord assembly 26 could include a second charge coupler that is configured to be coupled to a socket of the EVSE housing 24.

In an embodiment, the charge coupler 28 is configured to plug into an SAE J1772 type charge port assembly. However, other charge coupler configurations are further contemplated within the scope of this disclosure. The specific configurations of the charge coupler 28 and the charge port assembly 32 are therefore not intended to limit this disclosure. The charging cord assembly 26 may be further configured to provide any level of charging (e.g., Level 1 AC charging, Level 2 AC charging, DC charging, etc.) within the scope of this disclosure.

A user may find it difficult to keep apprised of the status of energy transfer events between the electrified vehicle 10 and the grid power source 20, such as when the user has temporarily stepped away from the electrified vehicle 10, for example. Moreover, if a fault occurs during the energy transfer, the user may be unaware that the desired energy transfer event has abruptly ended without either returning to the vehicle or setting up a mobile service for querying the vehicle as to the charging status. This disclosure therefore describes EVSE systems that include customizable charge status indicator systems that can provide visualize indication of the status of the energy transfer event while the user is away from the electrified vehicle 10 and that can be customized to suit the user's own personal styling and notification preferences.

Figure 2:
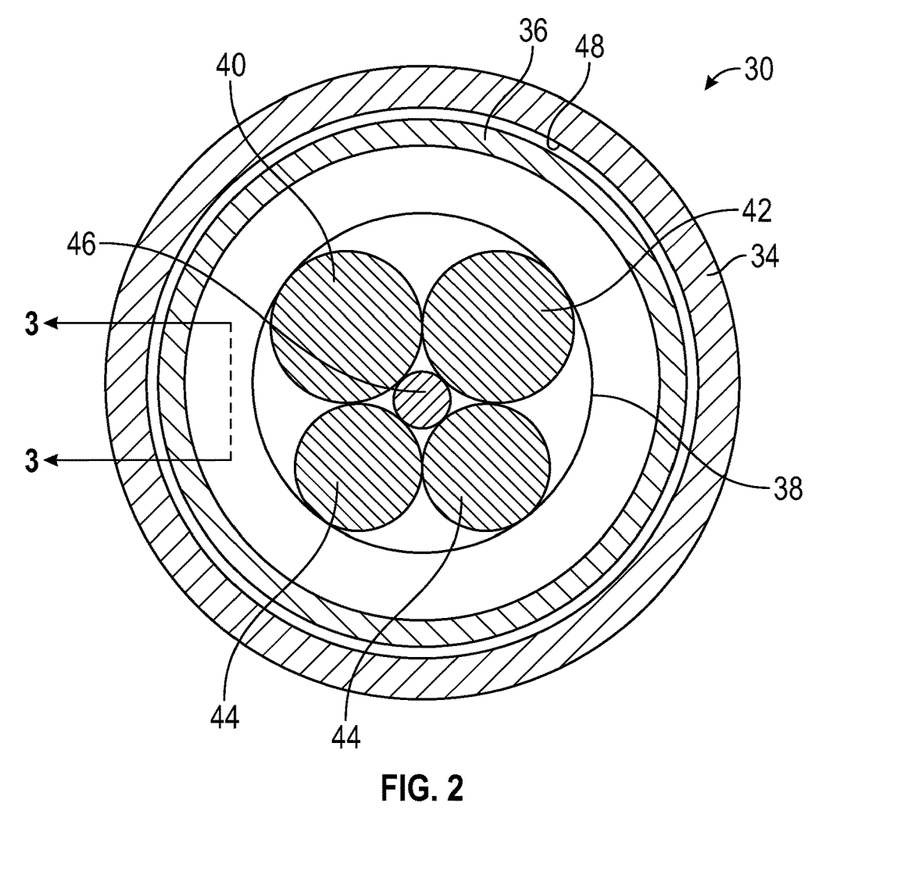
FIG. 2 is a cross-sectional view of a cable of a charging cord assembly of the EVSE system of FIG. 1.
Figure 3:
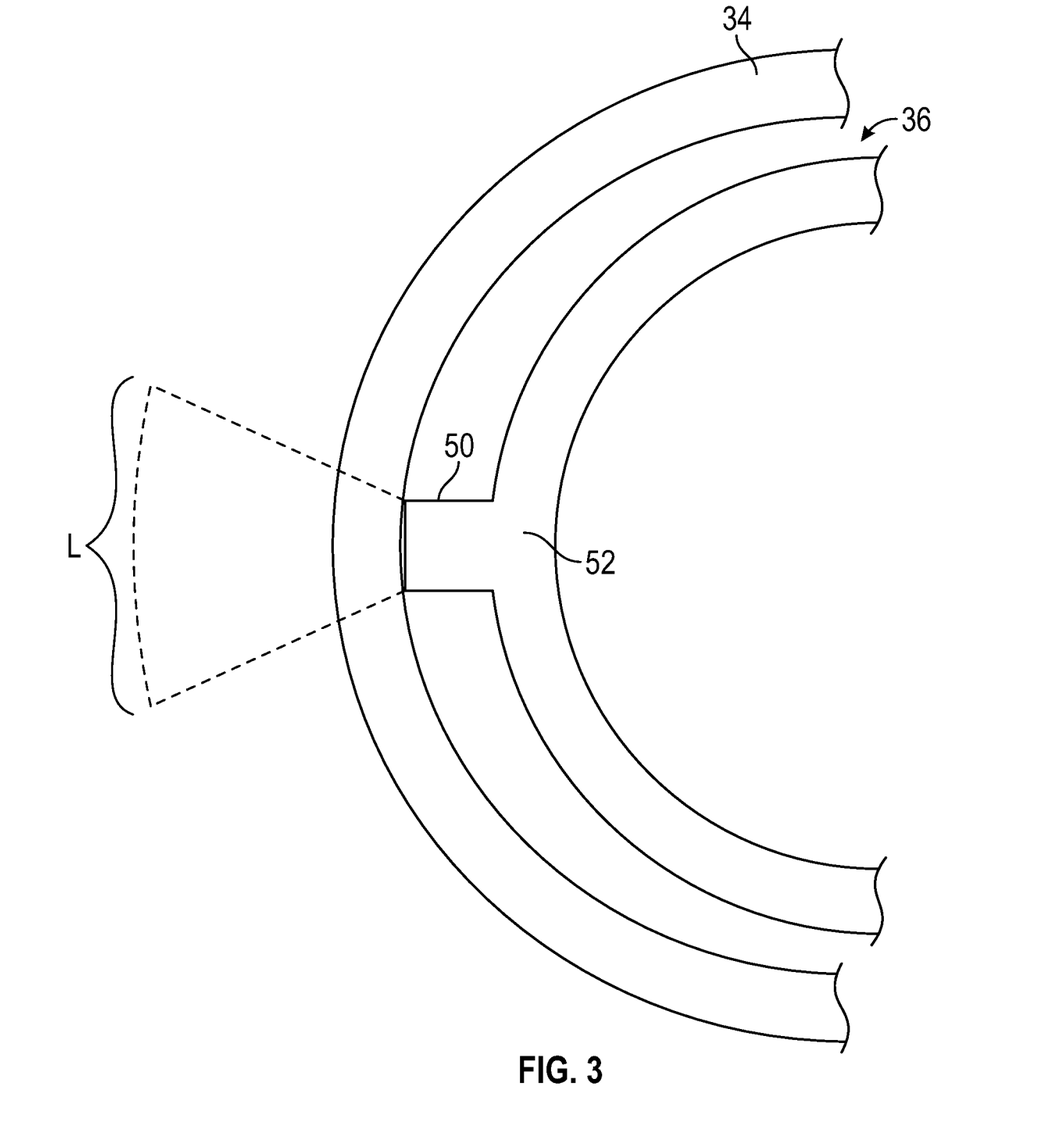
FIG. 3 is a cross-sectional view of a portion of a lighting module of the charging cord assembly of FIG. 2.

FIGS. 2-3 illustrate exemplary design details associated with the cable 30 of the charging cord assembly 26 of FIG. 1. The specific size (e.g., length, outer diameter, etc.) of the cable 30 is design dependent and is therefore not intended to limit this disclosure.

The cable 30 may include, among other things, an outer sheath 34, a lighting module 36, and a wire bundle 38. The lighting module 36 may circumscribe the wire bundle 38, and the outer sheath 34 may circumscribe the lighting module 36. In an embodiment, the outer sheath 34 establishes an outer annular surface of the cable 30.

The specific configuration of the lighting module 36 is not intended to limit this disclosure, however, in an exemplary embodiment, the lighting module 36 is configured as a lighting ring that circumscribes the wire bundle 38. The lighting module 36 may be secured or otherwise supported relative to a radially inner surface 48 of the outer sheath 34. In an embodiment, the lighting module 36 extends along an entire length of the cable 30 such that lighting effects that are designed to provide visual cues concerning energy transfer-related events may be emitted over the entire length of the cable 30.

The lighting module 36 may include one or more light sources 50 and a printed circuit board (PCB) 52 (see FIG. 3). The outer sheath 34 may be constructed from a light permeable material to allow light L from the light sources 50 to escape from the inside to the outside of the cable 30 for conveying various charging-related information to the user during energy transfer events involving the electrified vehicle 10 and the EVSE system 22. The light L may also permeate along the outer sheath 34 to create a glowing lighting effect.

Each light source 50 may be a light emitting diode (LED). In an embodiment, each light source 50 is a multi-colored LED, such as a Red, Green, Blue (RGB) LED, for example. Other light sources could also be utilized within the scope of this disclosure. The light sources 50 may be arranged on the PCB 52, which may include control circuitry including LED driver circuitry for controlling activation and deactivation of the light sources 50 in response to control signals received from the EVSE housing 24, for example.

The total number light sources 50 provided within the lighting module 36 may vary and is design dependent. In an embodiment, the lighting module 36 includes a sufficient number of light sources 50 for allowing users to visualize the combination of lighting effects emitted therefrom during both daytime conditions and nighttime conditions.

The wire bundle 38 may include a plurality of wires that are arranged together to form the wire bundle 38. An exemplary wire bundle 38 is schematically illustrated in FIG. 2, however, other designs are further contemplated within the scope of this disclosure. In an embodiment, the wire bundle 38 includes a first power wire 40, a second power wire 42, one or more communication wires 44, and a ground wire 46. However, the wire bundle 38 could include a greater or fewer number of wires within the scope of this disclosure.

The first power wire 40 may be a positive power wire and the second power wire 42 may be a negative power wire. Both the first and second power wires 40, 42 may be cylindrical, insulated conductor wires for conducting power during energy transfer events. AC power or DC power may be conducted by the first and second power wires 40, 42.

The communication wires 44 may be cylindrical, insulated communication wires for allowing vehicle-to-EVSE system communications during energy transfer events (e.g., when the charging cord assembly 26 is plugged into the charge port assembly 32). The communication wires 44 may include a different wire gauge than the first and second power wires 40, 42. In the illustrated embodiment, the wire bundle 38 includes two communication wires 44. However, a greater or fewer number of communication wires could be provided within the scope of this disclosure.

The ground wire 46 may be configured as another cylindrical wire of the wire bundle 38. The ground wire 46 may include a different wire gauge than any of the first power wire 40, the second power wire 42, and the communication wires 44.

Figure 4:
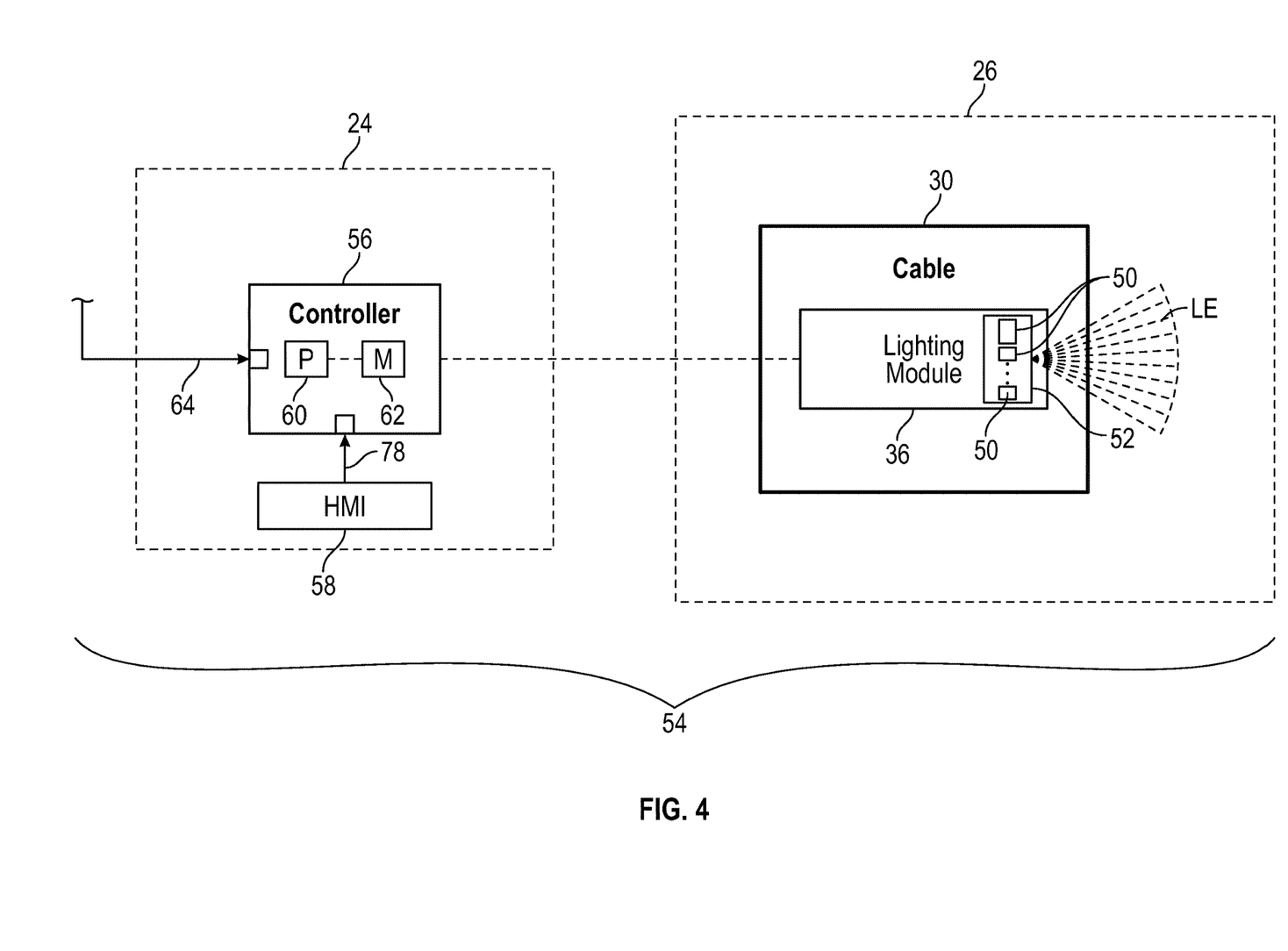
FIG. 4 schematically illustrates an exemplary charge status indicator system of the EVSE system of FIG. 1.

Referring now to FIG. 4, with continued reference to FIGS. 1-3, the lighting module 36 of the cable 30 may be part of a charge status indicator system 54 of the EVSE system 22. The charge status indicator system 54 may further include a controller 56 that is operably linked to the lighting module 36 and a human machine interface (HMI) 58. The controller 56 and the HMI 58 may be components of the EVSE housing 24, in an exemplary implementation.

As further detailed below, the controller 56 may receive various inputs (e.g., signals) from the electrified vehicle 10 for providing visually distinctive lighting effects LE that can be emitted by the lighting module 36 in order to convey various vehicle-specific charging-related information (e.g., charging level, charging type, charging faults, charging direction, charging status, charging pre-conditioning indicators, etc.) to a user. The various lighting effects LE that can be produced by the lighting module 36 may be customized in terms of color, pattern, brightness, speed of illumination, length of illumination, etc.

The controller 56 may include a processing unit 60 and non-transitory memory 62 for executing the various control strategies of the charge status indicator system 54. The processing unit 60 can be programmed to execute one or more programs stored in the memory 62. The programs may be stored in the memory 62 as software code, for example. The programs stored in the memory 62 may include one or more additional or separate programs, each of which includes an ordered list of executable instructions for implementing logical functions associated with the charge status indicator system 54.

The processing unit 60 can be a custom made or commercially available processor, a central processing unit (CPU), or generally any device for executing software instructions. The memory 62 can include any one or combination of volatile memory elements and/or nonvolatile memory elements.

The controller 56 may be programmed to selectively activate the light sources 50 of the lighting module 36, either individually or in units, to cause the light sources 50 to emit light through the outer sheath 34 of the cable 30 for conveying charging-related information to the user in response to receiving one or more vehicle data signals 64 from the electrified vehicle 10. In an embodiment, the vehicle data signal 64 may be communicated to the controller 56 via the communication wires 44 of the cable 30 when the charging cord assembly 26 is coupled to the charge port assembly 32 of the electrified vehicle 10. However, other embodiments are also contemplated within the scope of this disclosure (see, e.g., the wireless embodiment of FIG. 10, discussed below).

The vehicle data signal 64 may include information specific to the electrified vehicle 10, including but not limited to, vehicle charging status information. Vehicle charging status information may include the current state of charge (SOC) of the traction battery pack 12, the current energy transfer direction, data indicating that a passenger cabin of the electrified vehicle 10 is currently being pre-conditioned, data indicating that the traction battery pack 12 is currently being pre-conditioned, data indicating that a fault on-board the electrified vehicle 10 is preventing the transfer of energy, etc. The controller 56 may be programmed to analyze the vehicle data signal 64 to determine how the lighting module 36 should be controlled and may then communicate with the PCB 52 of the lighting module 36 to command specific lighting effects LE during energy transfer events.

FIGS. 5-9, with continued reference to FIGS. 1-4, schematically illustrate examples of specific lighting effects that can be produced by the charge status indicator system 54 during energy transfer events that can occur when the charging cord assembly 26 of the EVSE system 22 is operably coupled to the charge port assembly 32 of the electrified vehicle 10. It should be understood that the illustrated lighting effects are intended as non-limiting examples of visual cues that can be produced by the lighting module 36 of the cable 30. Where appropriate, a legend is included in these figures to aid the understanding of exemplary lighting effects.

Figure 5:
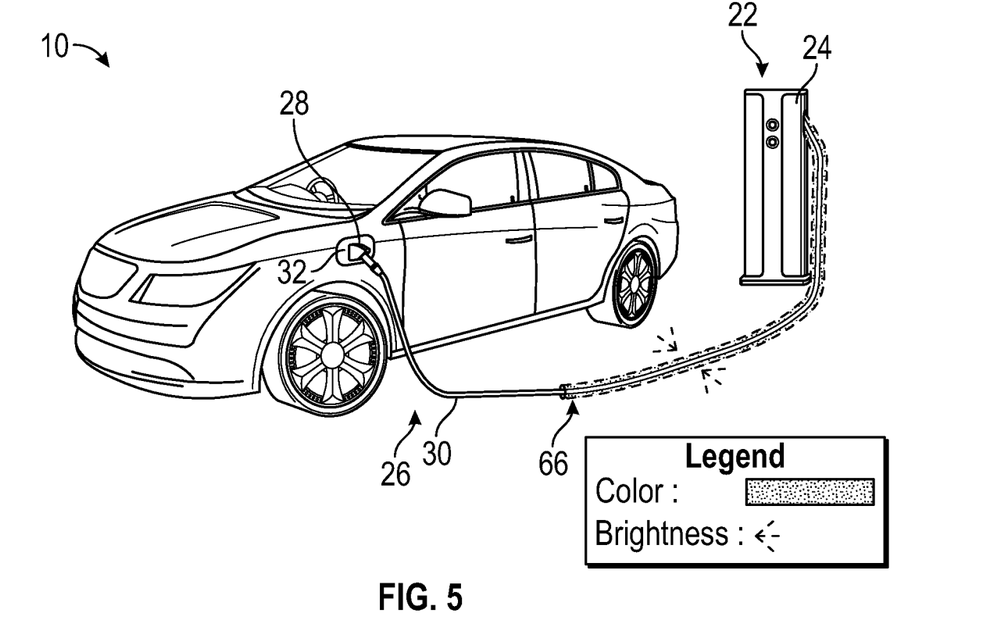
FIG. 5 schematically illustrates an exemplary lighting effect of the charge status indicator system of FIG. 4.

FIG. 5 illustrates a first exemplary lighting effect 66 that can be produced by the lighting module 36 of the charge status indicator system 54 in response to receiving the vehicle data signal 64. This example assumes the vehicle data signal 64 includes SOC information concerning the traction battery pack 12. In this exemplary embodiment, the number of light sources 50 commanded to be illuminated by the controller 56 can correspond generally to the current SOC of the traction battery pack 12. For example, if the current SOC of the traction battery pack 12 of the electrified vehicle 10 is approximately 50%, the controller 56 may communicate with the PCB 52 of the lighting module 36 for activating the light sources 50 associated with 50% of the overall length of the cable 30. The activated light sources 50 may be illuminated in any color (e.g., green), brightness, and/or pattern. In some implementations, the user may select the specific color, brightness, pattern, etc. associated with the first lighting effect 66 for indicating the SOC. The user observing the cable 30 when emitting the first lighting effect 66 would understand that, because approximately half of the length of the cable 30 is illuminated, the SOC of the traction battery pack 12 is approximately 50%.

The 50% SOC lighting effect described above is used only as an example, and it should be recognized that the lighting module 36 could be controlled to emit light for visually indicating any SOC percentage (e.g., 25%, 50%, 75%, 100%, etc.) of the traction battery pack 12 during energy transfer events. In addition, as an alternative to visually indicating the current SOC percentage during energy transfer events, the lighting module 36 could be controlled in a similar manner for visually indicating an amount of charging time remaining until reaching 100% SOC, an amount of time remaining for transferring a desired amount of energy to the grid power source 20, an amount of free charging time remaining, etc.

Figure 6:
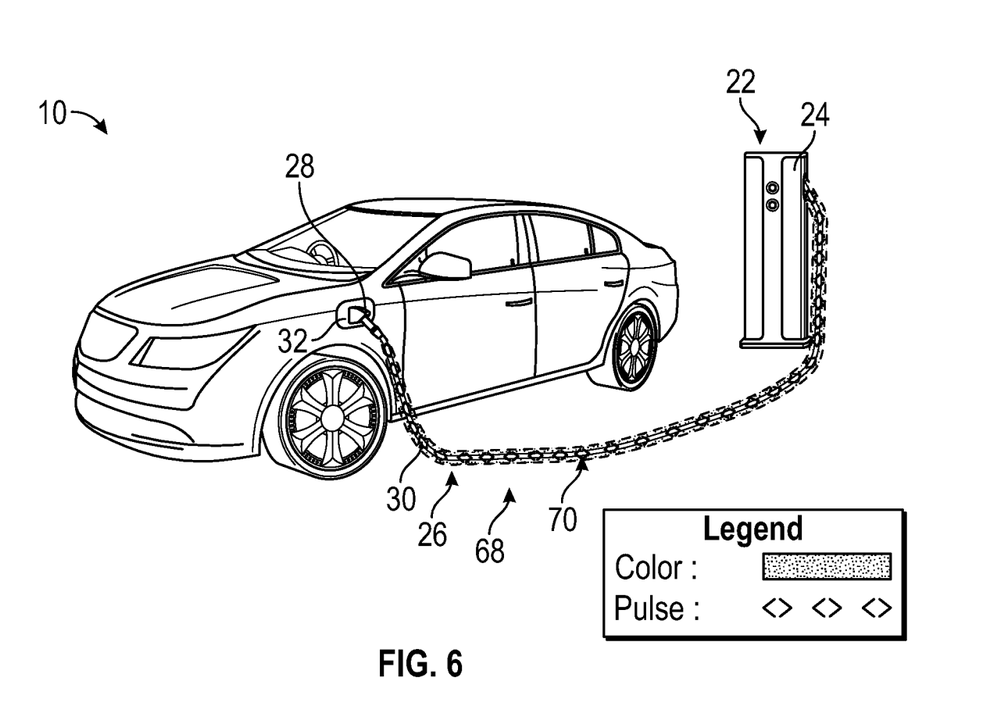
FIG. 6 schematically illustrates another exemplary lighting of the charge status indicator system of FIG. 4.

FIG. 6 illustrates a second exemplary lighting effect 68 that can be produced by the lighting module 36 of the charge status indicator system 54 in response to receiving the vehicle data signal 64. In this example, the vehicle data signal 64 may include information related to a direction to energy transfer during the energy transfer event. In this exemplary embodiment, the light sources 50 of the lighting module may be commanded to illuminate in a pulsing pattern 70 by the controller 56 for visually indicating a direction of the energy transfer. For example, if the traction battery pack 12 is receiving power from the grid power source 20, the pulsing pattern 70 may flow in a direction from the electrified vehicle 10 toward the EVSE housing 24. Alternatively, if the traction battery pack 12 is supplying power to the grid power source 20, the pulsing pattern 70 may flow in a direction from the EVSE housing 24 toward the electrified vehicle 10. The user observing the cable 30 while it is emitting the second lighting effect 68 would understand the direction of the energy transfer based on the direction of the pulsing pattern 70 being emitted from the cable 30.

The speed of the pulsing pattern 70 may be corelated to the speed of the charge (e.g., charging at the capacity of the EVSE/vehicle would produce faster pulses, whereas slow rates of charge would produce slower pulses). As the vehicle gets closer to a 100% state of charge, the charge rate typically reduces and thus the speed of the pulsing pattern 70 may become slower.

The activated light sources 50 may be illuminated in any color, brightness, and/or speed for generating the pulsing pattern 70 of the second lighting effect 68. In some implementations, the user may select the specific color, brightness, and/or speed of the pulsing pattern 70 associated with the second lighting effect 68.

Figure 7:
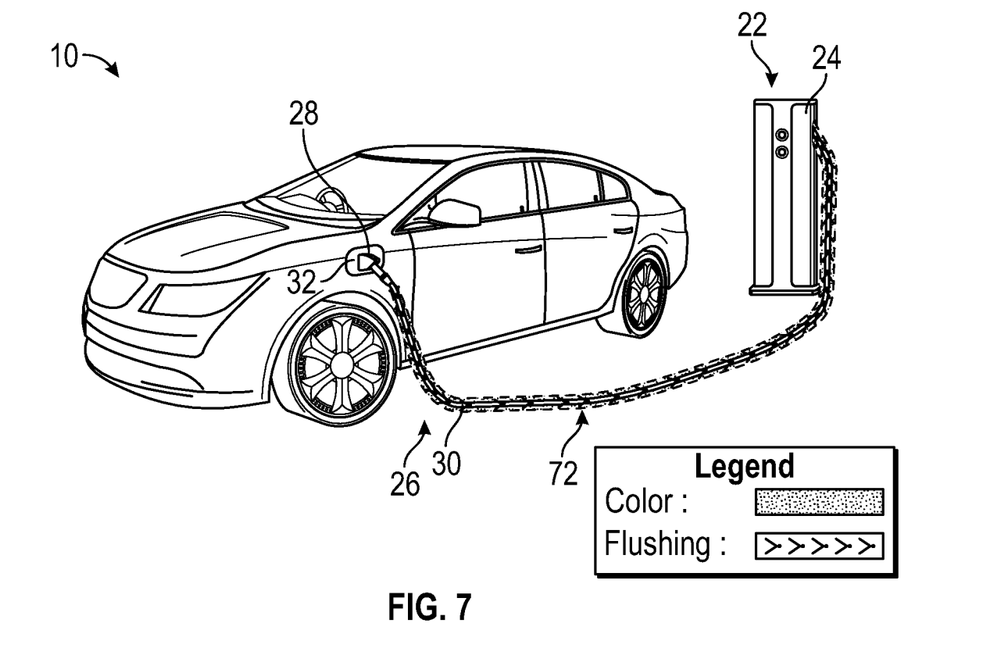
FIG. 7 schematically illustrates another exemplary lighting effect of the charge status indicator system of FIG. 4.

FIG. 7 illustrates a third exemplary lighting effect 72 that can be produced by the lighting module 36 of the charge status indicator system 54 in response to receiving the vehicle data signal 64. In this example, the vehicle data signal 64 may indicate a fault onboard the electrified vehicle 10 that is preventing the transfer of energy during the energy transfer event. In this exemplary embodiment, the light sources 50 of the lighting module may be commanded to emit flashing lights in a specific color (e.g., red) for visually indicating the vehicle charging fault condition. The user observing the cable 30 while it is emitting the third lighting effect 72 would be capable of easily recognizing the fault condition based on the colored flashing pattern being emitted from the cable 30.

The activated light sources 50 may be illuminated in any color, brightness, and/or pattern for generating the third lighting effect 72. In some implementations, the user may select the specific color, brightness, and/or pattern of the third lighting effect 72.

Figure 8:
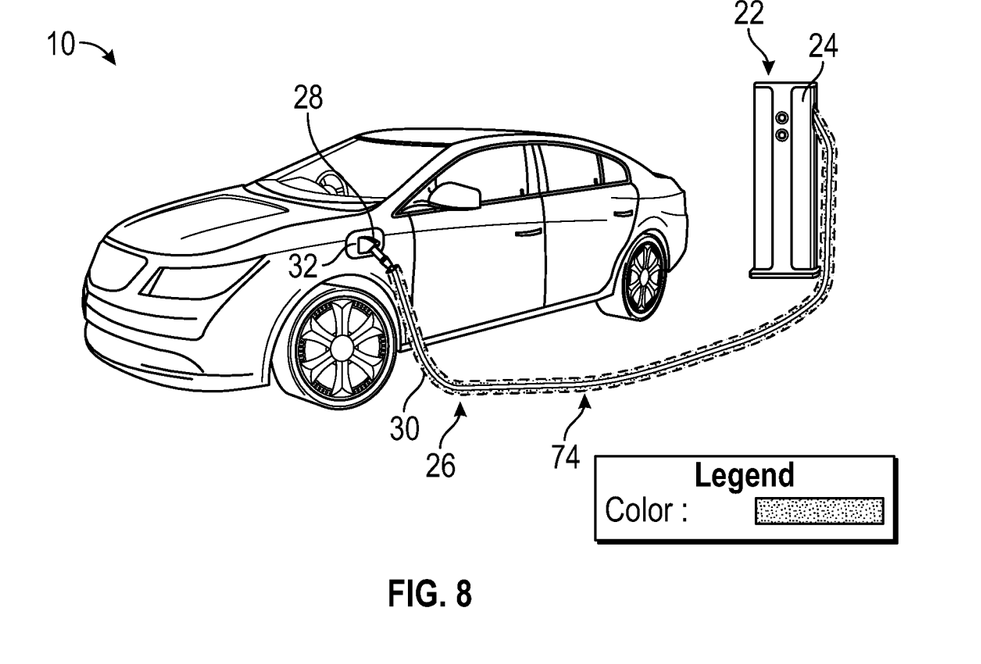
FIG. 8 schematically illustrates another exemplary lighting effect of the charge status indicator system of FIG. 4.

FIG. 8 illustrates a fourth exemplary lighting effect 74 that can be produced by the lighting module 36 of the charge status indicator system 54 in response to receiving the vehicle data signal 64. In this example, the vehicle data signal 64 may include information indicating that the passenger cabin of the electrified vehicle 10 is being pre-conditioned (i.e., heated or cooled by the vehicle's HVAC system) during the energy transfer event. In this exemplary embodiment, the light sources 50 of the lighting module 36 may be commanded to illuminate in a specific color (e.g., blue) for visually indicating that the pre-conditioning task is being executed. The user observing the cable 30 while it is emitting the fourth lighting effect 74 would be capable of easily recognizing that the pre-conditioning event is occurring based on the color being emitted from the cable 30.

The activated light sources 50 may be illuminated in any color, brightness, and/or pattern for generating the fourth lighting effect 74. In some implementations, the user may select the specific color, brightness, and/or pattern of the fourth lighting effect 74.

Figure 9:
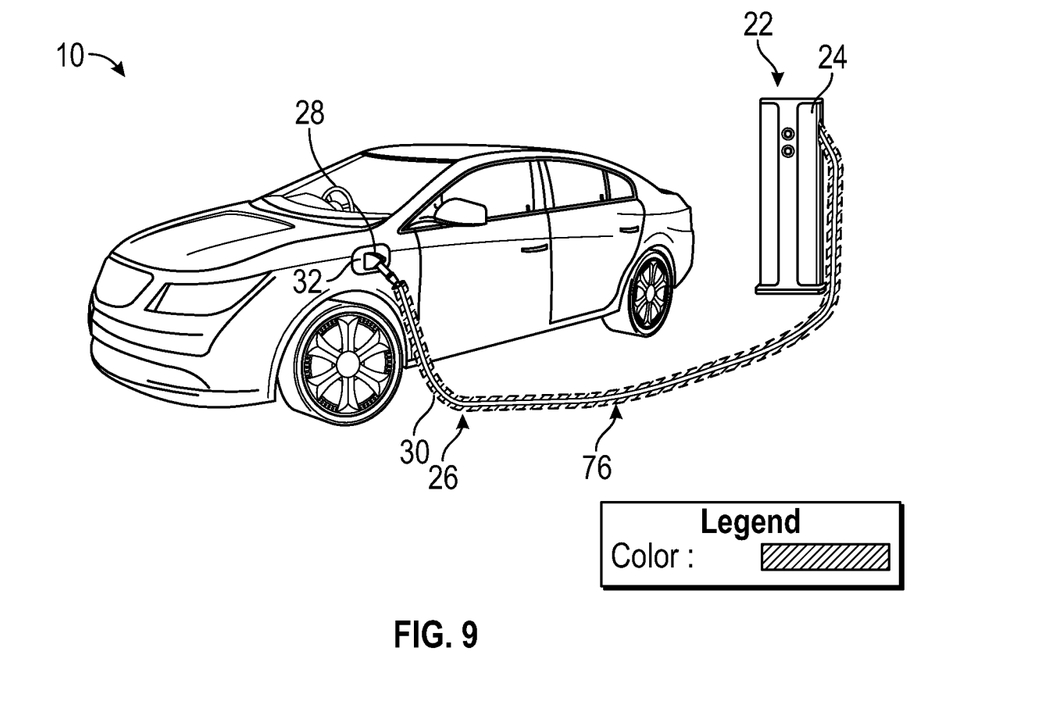
FIG. 9 schematically illustrates yet another exemplary lighting effect of the charge status indicator system of FIG. 4.

FIG. 9 illustrates a fifth exemplary lighting effect 76 that can be produced by the lighting module 36 of the charge status indicator system 54 in response to receiving the vehicle data signal 64. In this example, the vehicle data signal 64 may include information indicating that the traction battery pack 12 of the electrified vehicle 10 is being pre-conditioned (i.e., heated or cooled by the vehicle's thermal management system) during the energy transfer event. In this exemplary embodiment, the light sources 50 of the lighting module may be commanded to illuminate in a specific color (e.g., orange or any other color that is different from the color associated with the fourth lighting effect 74)

for visually indicating that the pre-conditioning task is being executed. The user observing the cable 30 while it is emitting the fifth lighting effect 76 could easily recognize that the pre-conditioning event is occurring based on the color being emitted from the cable 30.

The activated light sources 50 may be illuminated in any color, brightness, and/or pattern for generating the fifth lighting effect 76. In some implementations, the user may select the specific color, brightness, and/or pattern of the fifth lighting effect 76.

If vehicle data signals 64 are received that indicate multiple vehicle conditions occurring at the same time, the charge status indicator system 54 may arbitrate the signals in order to determine which lighting effects should be produced during the energy transfer event. In an embodiment, the charge status indicator system 54 may be programmed to prioritize lighting effects for user selected conditions (e.g., cabin conditioning over battery conditioning) when multiple vehicle conditions are occurring simultaneously. In another embodiment, the charge status indicator system 54 may be configured to indicate multiple lighting effects in an alternating fashion.

It should be understood other lighting effects can be produced by the lighting module 36 of the cable 30. For example, the charge status indicator system 54 could produce a unique lighting effect for charging complete conditions, waiting to charge conditions, or any other vehicle charging condition.

Referring again to FIG. 4, the HMI 58 of the charge status indicator system 54 may include various user interfaces for displaying information to the user and for allowing the user to enter information into the HMI 58. The user may interact with the user interfaces via various touch screens, tactile buttons, audible speech, speech synthesis, etc., or any combination of such input devices.

In an embodiment, the HMI 58 is a component of the EVSE housing 24 and is therefore accessible without the need to physically interact with the electrified vehicle 10. In another embodiment, the HMI 58 is a component of the electrified vehicle 10. In yet another embodiment, the HMI 58 could be associated with a personal electronic device (e.g., a smart phone) of the user of the electrified vehicle 10.

In an embodiment, the HMI 58 enables the user to customize various settings associated with the charge status indicator system 54. For example, the user may customize, via the HMI 58, features such as color, pattern, brightness, speed of illumination, length of illumination, link to audio files, etc. of the various lighting effects LE that can be emitted by the lighting module 36 of the charge status indicator system 54. When the user has customized a particular setting associated with the charge status indicator system 54 using the HMI 58, the HMI 58 may communicate a input signal 78 to the controller 56. In response to receiving the input signal 78, the controller 56 may subsequently command the lighting module 36 to apply a custom color, pattern, etc. to be emitted from the cable 30 during a subsequent charging event (e.g., when the charging cord assembly 26 is next plugged into the charge port assembly 32). Each light source 50 of the lighting module 36 of the charge status indicator system 54 can be selectively controlled, either individually or in units, to generate the requested customized color, pattern, etc. to be emitted by the lighting module 36.

Figure 10:
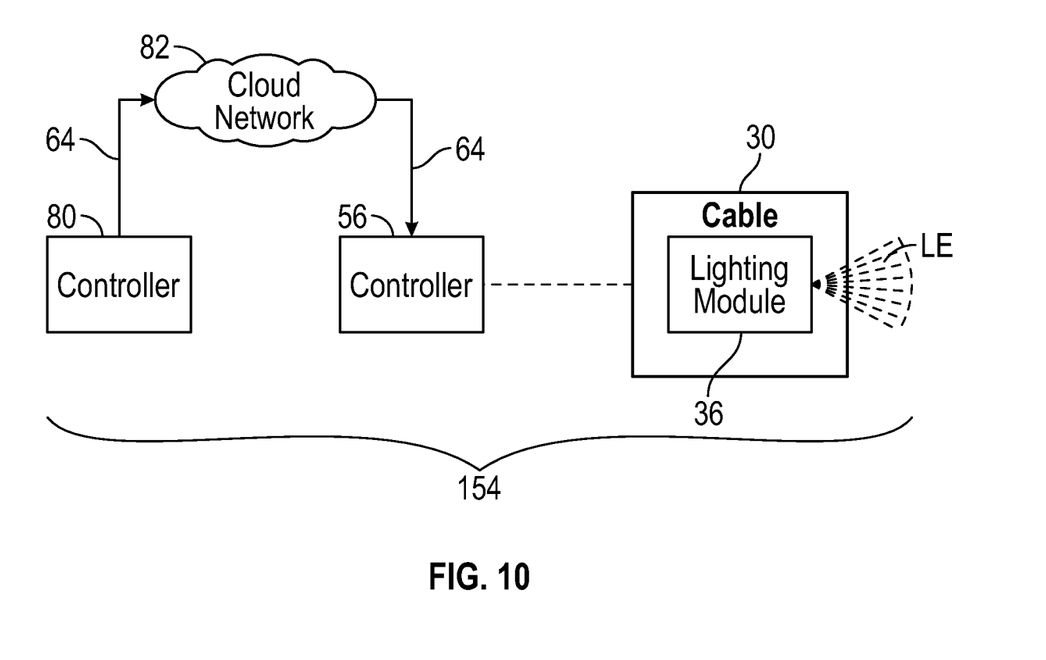
FIG. 10 schematically illustrates another exemplary charge status indicator system of an EVSE system.

FIG. 10 illustrates another exemplary charge status indicator system 154 for the EVSE system 22. In this embodiment, the charge status indicator system 154 may include the lighting module 36 of the cable 30, the controller 56 of the EVSE housing 24, and a controller 80 of the electrified vehicle 10.

The controller 56 and the controller 80 may be configured to communicate with one another for controlling the functionality of the lighting module 36. In an embodiment, the controller 56 and the controller 80 may be equipped to communicate with one another over a cloud network 82 (e.g., the internal for exchanging information therebetween. For example, the controller 80 may wirelessly communicate the vehicle data signal 64 over the cloud network 82. The vehicle data signal may be transmitted from the controller 80 to the controller 56 via one or more cellular towers or some other known communication technique (e.g., Wi-Fi, Bluetooth®, data connectivity, wireless mesh networks, lower power long range networks, smart utility networks, etc.). Upon receiving the vehicle data signal 64, the controller 56 may determine how to control the lighting module 36 for producing a desired lighting effect LE.

Figure 11:
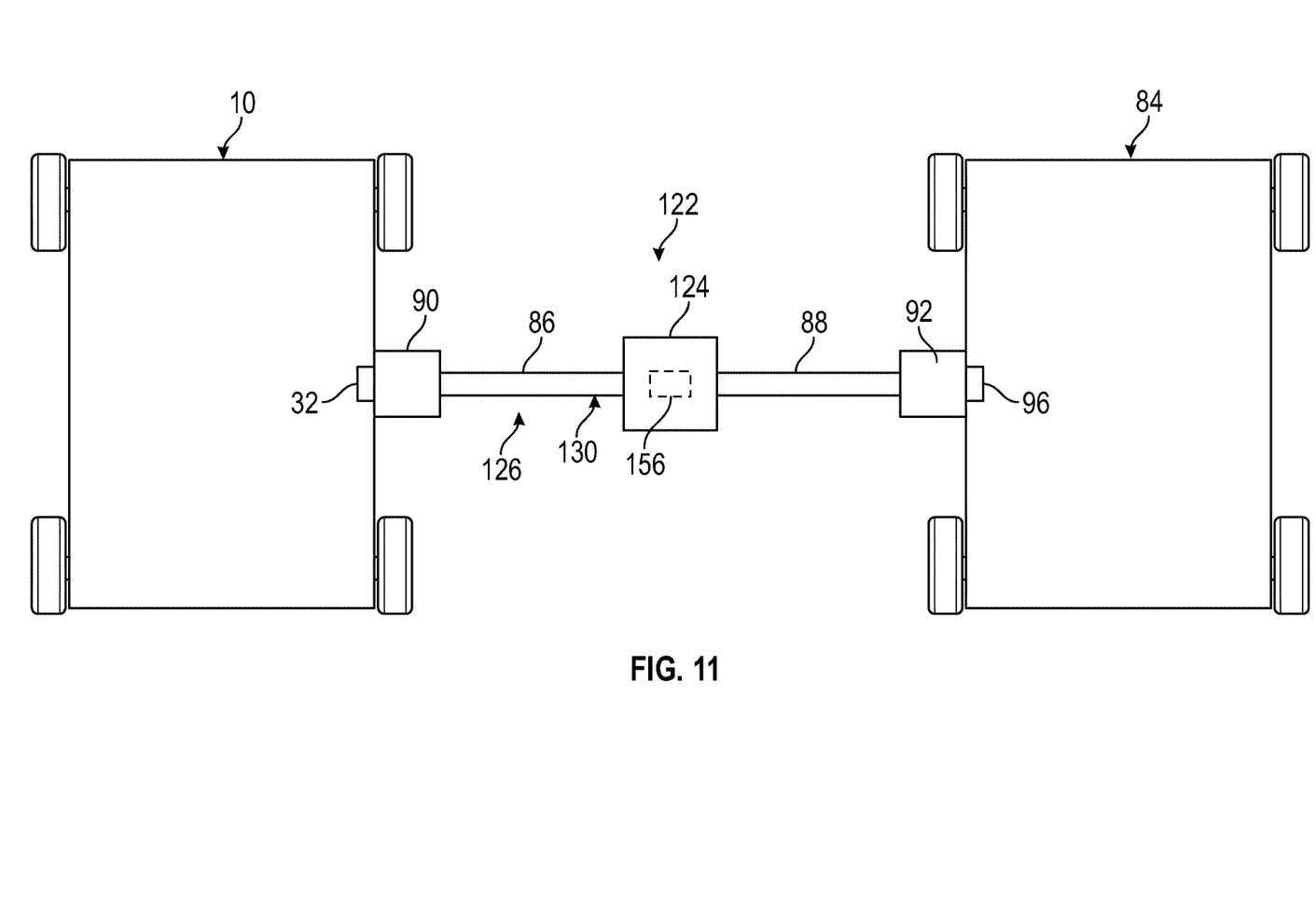
FIG. 11 illustrates another exemplary EVSE system.

FIG. 11 illustrates another exemplary EVSE system 122 that can be utilized during energy transfer events between the electrified vehicle 10 and a second electrified vehicle 84. The EVSE system 122 may therefore support the bidirectional transfer of energy from the electrified vehicle 10 to the second electrified vehicle 84 or vice versa.

The EVSE system 122 may include an EVSE housing 124 and a charging cord assembly 126. In this embodiment, the EVSE housing 124 is integrated within the length of a cable 130 of the charging cord assembly 126 such that a first section 86 of the cable 130 extends from a first side of the EVSE housing 124 and a second section 88 of the cable 130 extends from an opposite side of the EVSE housing 124.

In addition to the cable 130, the charging cord assembly 126 may include a first charge coupler 90 and a second charge coupler 92. The first charge coupler 90 may be connected to the first section 86 of the cable 130, and the second charge coupler 92 may be connected to the second section 88 of the cable 130. The first charge coupler 90 may be coupled to the charge port assembly 32 of the electrified vehicle 10 and the second charge coupler 92 may be coupled to a charge port assembly 96 of the second electrified vehicle 84 for transferring power therebetween.

A controller 156 of the EVSE housing 124 may receive various inputs (e.g., signals) from the electrified vehicle 10 and/or the second electrified vehicle 84 for providing visually distinctive lighting effects that can be emitted by a lighting module (not shown in FIG. 11) of the cable 130 in order to convey various vehicle-specific charging-related information (e.g., charging level, charging type, charging faults, charging direction, charging complete, charging pre-conditioning indicators, etc.) to a user. The various lighting effects of the lighting module 36 may be customized in terms of color, pattern, brightness, speed of illumination, length of illumination, etc.

The EVSE systems of this disclosure include customizable charge status indicator systems that provide users with the ability to customize the lighting effects that may be emitted from a charging cable of the EVSE system. The proposed charge status indicator systems enable users to understand the charging status when located away from the vehicle and without interacting with the vehicle and further allow for sustained visual status of charging events even when the vehicle has stopped indicating to save power. The proposed systems may further be beneficial to customers who dislike the default charge status colors/pattern settings selected by the manufacturer.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electric vehicle supply equipment (EVSE) system, comprising:
   an electric vehicle supply equipment (EVSE) housing;
   a charging cord assembly connected to the EVSE housing and including a cable that includes an outer sheath and a lighting module including a lighting ring that is circumscribed by the outer sheath along an entire length of the cable; and
   a controller programmed to command the lighting module to emit a lighting effect that provides a visual indication of an electrified vehicle charging status.

2. The EVSE system as recited in claim 1, wherein the lighting module includes one or more light sources and a printed circuit board (PCB).

3. The EVSE system as recited in claim 2, wherein the one or more light sources is a multi-colored light emitting diode (LED).

4. The EVSE system as recited in claim 1, wherein the outer sheath comprises a light permeable material.

5. The EVSE system as recited in claim 1, wherein the lighting effect includes a visual indication of a state of charge (SOC) of a traction battery pack of the electrified vehicle.

6. The EVSE system as recited in claim 1, wherein the lighting effect includes a visual indication of a direction of energy transfer associated with an energy transfer event.

7. The EVSE system as recited in claim 6, wherein the lighting effect includes a pulsing pattern that indicates the direction of the energy transfer.

8. The EVSE system as recited in claim 7, wherein a speed of the pulsing pattern is indicative of a rate of charge of a traction battery pack of the electrified vehicle.

9. The EVSE system as recited in claim 1, wherein the lighting effect includes a visual indication of a charging fault condition.

10. The EVSE system as recited in claim 1, wherein the lighting effect includes a visual indication of a pre-conditioning event associated with a passenger cabin or a traction battery pack of the electrified vehicle.

11. The EVSE system as recited in claim 1, comprising a human machine interface (HMI) configured to allow a user to modify a setting associated with the lighting effect.

12. The EVSE system as recited in claim 1, wherein the controller is further programmed to prioritize the lighting effect over another lighting effect when two or more vehicle conditions occur simultaneously.

13. The EVSE system as recited in claim 1, wherein the lighting effect includes a first pulsing pattern that flows in a direction toward the electrified vehicle when power is being transferred from a grid power source to the electrified vehicle, and the lighting effect includes a second pulsing pattern that flows in a direction toward the grid power source when power is being transferred from the vehicle to the grid power source.

14. A method, comprising:
   receiving, at a controller of an electric vehicle supply equipment (EVSE) system, a vehicle data signal from an electrified vehicle that is operably coupled to the EVSE system,
   wherein the vehicle data signal includes charging status information concerning the electrified vehicle; and
   commanding a lighting module of a cable of a charging cord assembly of the EVSE system to emit a lighting effect that is based on the charging status information,
   wherein the lighting effect includes a first pulsing pattern that flows in a direction toward the electrified vehicle when power is being transferred from a grid power source to the electrified vehicle, and the lighting effect includes a second pulsing pattern that flows in a direction toward the grid power source when power is being transferred from the electrified vehicle to the grid power source.

15. The method as recited in claim 14, wherein the lighting effect includes a visual indication of a state of charge (SOC) of a traction battery pack of the electrified vehicle.

16. The method as recited in claim 14, wherein the lighting effect includes a visual indication of an amount of time remaining for transferring energy between athe grid power source and the electrified vehicle.

17. The method as recited in claim 14, wherein the lighting effect includes a visual indication of a charging fault condition associated with the electrified vehicle.

18. The method as recited in claim 14, wherein the lighting effect includes a visual indication of a pre-conditioning event associated with a passenger cabin or a traction battery pack of the electrified vehicle.

19. The method as recited in claim 14, comprising:
   receiving an input signal indicative of a modification to a setting associated with the lighting effect from a human machine interface (HMI).

* * * * *